US009769607B2

United States Patent
Chu et al.

(10) Patent No.: US 9,769,607 B2
(45) Date of Patent: Sep. 19, 2017

(54) DETERMINING PROXIMITY OF COMPUTING DEVICES USING ULTRASONIC AUDIO SIGNATURES

(71) Applicant: Cisco Technology, Inc., San Jose, CA (US)

(72) Inventors: Yun Yaw Chu, Orly (FR); Laurent Chauvier, Villevallier (FR); Olivier Paris, Paris (FR); Noureddine Taibi, Paris (FR); Simon John Parnall, Surrey (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/864,690

(22) Filed: Sep. 24, 2015

(65) Prior Publication Data

US 2017/0094464 A1  Mar. 30, 2017

(51) Int. Cl.
*H04B 7/00* (2006.01)
*H04W 4/02* (2009.01)
*H04B 11/00* (2006.01)
*H04W 76/02* (2009.01)

(52) U.S. Cl.
CPC ............ *H04W 4/023* (2013.01); *H04B 11/00* (2013.01); *H04W 76/023* (2013.01)

(58) Field of Classification Search
CPC .............. H04M 3/42221; H04M 3/561; H04R 2227/003; H04R 2499/11; H04R 27/00; H04R 3/005; H04R 5/027; H04S 2400/15; H04S 3/00
See application file for complete search history.

(56) References Cited

U.S. PATENT DOCUMENTS

| | | | |
|---|---|---|---|
| 8,660,581 B2 | 2/2014 | Davis et al. | |
| 8,700,407 B2 | 4/2014 | Wang et al. | |
| 8,830,792 B2 | 9/2014 | Taylor et al. | |
| 9,307,564 B2* | 4/2016 | Kim | H04W 76/023 |
| 2002/0126872 A1* | 9/2002 | Brunk | G06K 9/00744 382/100 |
| 2010/0057590 A1* | 3/2010 | Wesby | G06F 17/30743 705/26.1 |
| 2012/0003956 A1* | 1/2012 | Austin | H04M 1/72538 455/404.2 |
| 2012/0224707 A1 | 9/2012 | Kim et al. | |
| 2013/0110565 A1* | 5/2013 | Means, Jr. | G06Q 10/063 705/7.11 |
| 2013/0185214 A1* | 7/2013 | Azen | G06Q 20/206 705/76 |

(Continued)

*Primary Examiner* — Dominic Rego
(74) *Attorney, Agent, or Firm* — Ronald S. Fernando

(57) ABSTRACT

In some implementations a method includes receiving a first request for a first ultrasonic audio signature from a first computing device. The method also includes transmitting first data indicative of the first ultrasonic audio signature to the first computing device. The method further includes receiving audio data from a second computing device. The method further includes determining that the audio data is indicative of the first ultrasonic audio signature. The method further includes transmitting, to one or more of the first computing device or the second computing device, a message indicating that the first computing device is in proximity to the second computing device.

20 Claims, 8 Drawing Sheets

(56) References Cited

U.S. PATENT DOCUMENTS

| | | | |
|---|---|---|---|
| 2014/0136637 A1* | 5/2014 | Chen | H04L 51/20 709/206 |
| 2014/0254807 A1 | 9/2014 | Fonseca, Jr. et al. | |
| 2014/0254820 A1* | 9/2014 | Gardenfors | H04R 3/005 381/80 |
| 2014/0314237 A1* | 10/2014 | Cottrell | H04H 60/02 381/2 |
| 2015/0003595 A1* | 1/2015 | Yaghi | G06Q 10/063 379/85 |
| 2015/0017917 A1* | 1/2015 | Guo | H04W 4/023 455/41.2 |
| 2015/0071505 A1* | 3/2015 | Kim | G06K 9/00167 382/119 |
| 2015/0119067 A1* | 4/2015 | Lavery | H04W 64/003 455/456.1 |
| 2016/0028356 A1* | 1/2016 | Eltoft | H03G 1/02 381/105 |
| 2016/0100285 A1* | 4/2016 | Zhu | H04W 4/023 455/426.1 |
| 2016/0150537 A1* | 5/2016 | Jung | H04W 48/16 455/452.1 |

\* cited by examiner

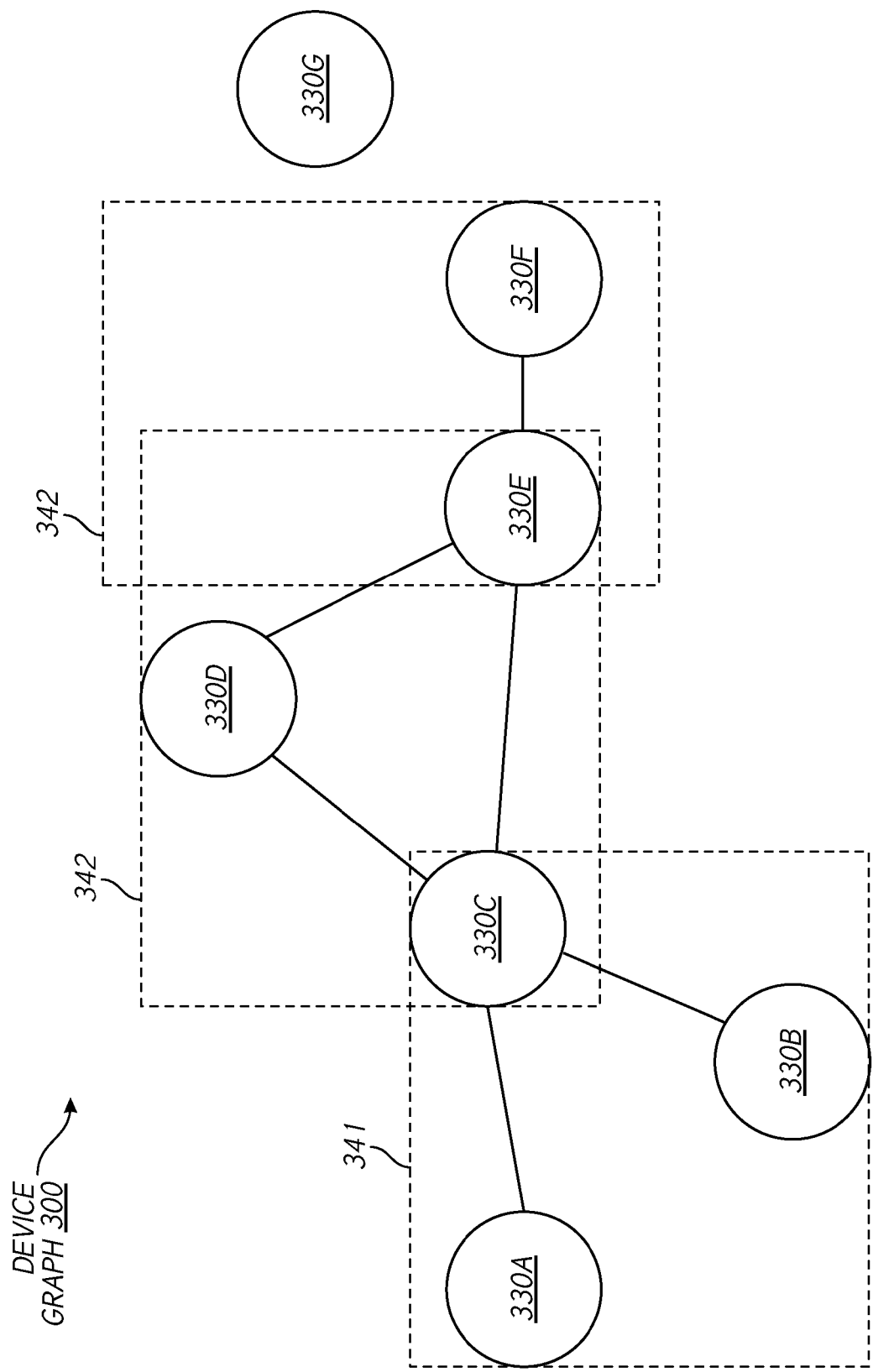

DETERMINING PROXIMITY OF COMPUTING DEVICES USING ULTRASONIC AUDIO SIGNATURES

FIELD OF THE INVENTION

The present disclosure relates to determining the proximity of computing devices. More specifically, the present disclosures relates to determining the proximity of computing devices using ultrasonic audio signature.

BACKGROUND

Computing devices are now commonplace in various settings and/or environments. For example, there may be multiple computing devices (e.g., smartphones, laptop computers, tablet computers, televisions, set top boxes (STBs), speakers, etc.) in a household (e.g., a house), a building, a room (e.g., a meeting room, an auditorium), etc. Some of the computing devices may be stationary (e.g., static). For example, some of the computing devices (e.g., speakers) may located in a location (e.g., a location in a room) and may not move (e.g., may not be mobile). Other computing devices may be mobile. For example, a smartphone, tablet computer, laptop computer, etc., may be moved (e.g., carried) from one location (e.g., a first room) to another location (e.g., a second room) by a user.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

FIG. 3 is a diagram illustrating an example device graph, in accordance with some embodiments.

Figure 1:
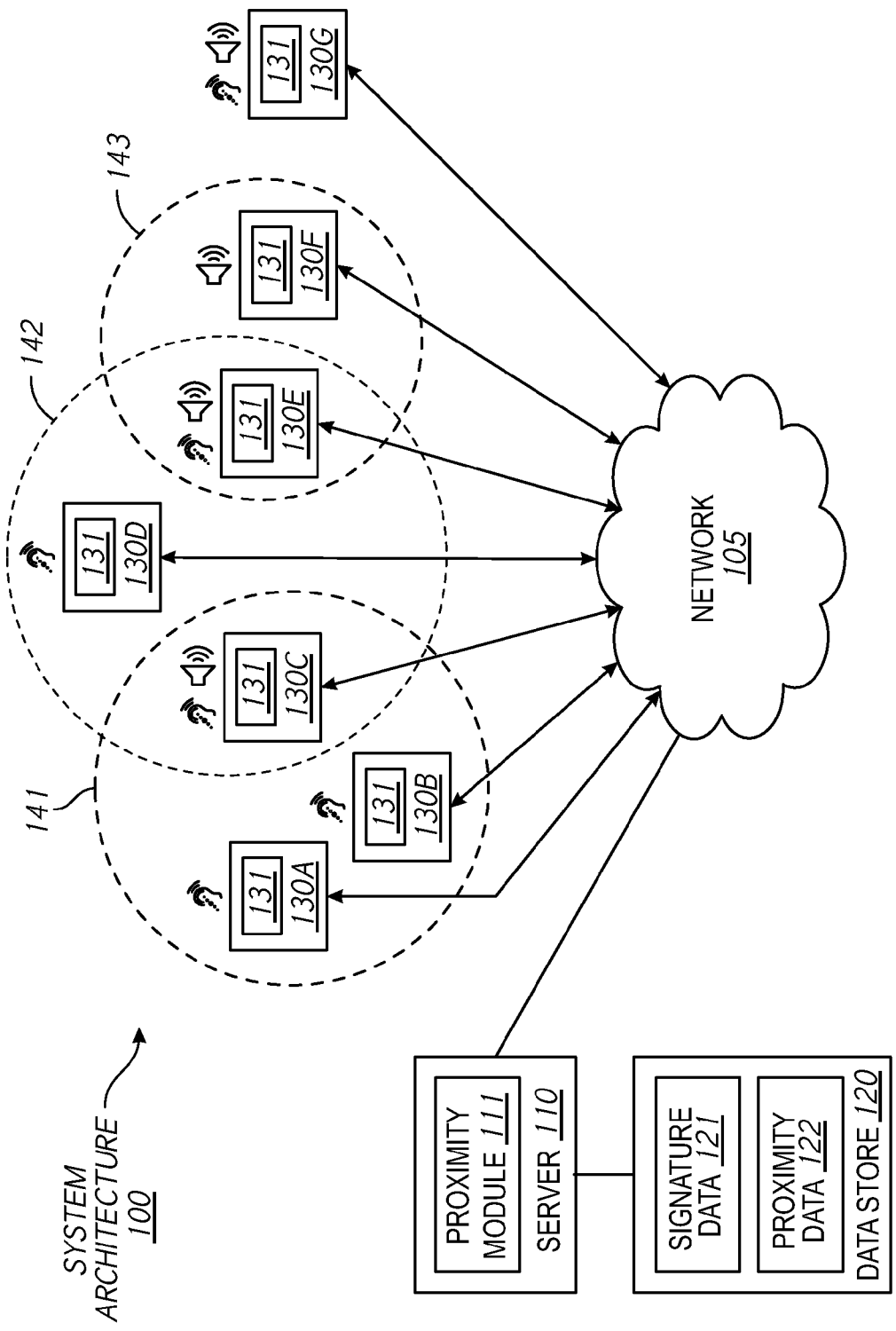
FIG. 1 is a block diagram illustrating a system architecture, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for determining whether computing devices are in proximity to each other. For example, in some implementations a method includes receiving a first request for a first ultrasonic audio signature from a first computing device. The method also includes transmitting first data indicative of the first ultrasonic audio signature to the first computing device. The method further includes receiving audio data from a second computing device. The method further includes determining that the audio data is indicative of the first ultrasonic audio signature. The method further includes transmitting, to one or more of the first computing device or the second computing device, a message indicating that the first computing device is in proximity to the second computing device.

In other implementations, a method includes transmitting a request for an ultrasonic audio signature to a server. The method also includes receiving first data indicative of the ultrasonic audio signature from the server. The method further includes emitting the ultrasonic audio signature based on the first data indicative of the ultrasonic audio signature.

In further implementations, an apparatus includes one or more processors and a memory comprising instructions that when executed cause the one or more processors to perform operations. The operations include transmitting a message to a server indicating that the apparatus will provide audio data to the server. The operations also include obtaining the audio data, wherein the audio data is indicative of an ultrasonic audio signature of a computing device. The operations further include transmitting the audio data to the server.

Detailed Description

As discussed above, computing devices are now commonplace in various settings/environments and multiple computing devices may be located in the various settings/environments. Some computing devices (e.g., speakers, set top boxes, etc.) may be stationary (e.g., static). Other computing devices (e.g., smartphones, tablet computers, laptop computers, etc.) may be mobile. As computing devices are moved through a setting/environment, the computing devices may come into proximity to each other and/or may move further from each other (e.g., one computing device may leave the proximity of another computing device). For example, a computing device may move (e.g., a user may move the computing device) to a different side of a room. In another example, a computing device may be moved from one room in a house/building to another room in a house/building.

Computing devices may establish connections with one another to communicate data. For example, a smartphone may establish a connection with a speaker (e.g., a Bluetooth speaker) and may play music via the speaker (e.g., may communicate data with the speaker). In another example, a tablet computing may establish a connection with a media streaming device (e.g., a computing device). The computing device may play a video on a television via the media streaming device (e.g., may communicate video data with the media streaming device). Establishing a connection and/or communicating data between two computing devices may be referred to as pairing. It may be useful to determine which computing devices are in proximity to each other. This may allow a server and/or a computing device to identify other computing devices to pair with based on their proximity. For example, it may be more useful for a smartphone to pair with a Bluetooth speaker that is in proximity to the smartphone, as the user may be holding the smartphone and may not be able to hear music that is played via the Bluetooth speaker if the Bluetooth speaker is too far away.

In some embodiments, a system architecture may use ultrasonic audio signatures to determine which computing devices are in proximity with each other. A server may assign ultrasonic audio signatures to a plurality of computing devices. Some of the computing devices may emit an ultrasonic audio signature and some of the computing devices may detect ultrasonic sound. The computing devices that detect ultrasonic sound may transmit audio data to the server and the server may determine which computing device are in proximity with each other based on the ultrasonic audio signatures that are captured in the audio data. The server may provide proximity data (e.g., data indicating which computing devices are in proximity with each other) to the computing devices and the computing devices may pair with each other based on the proximity data and/or based on instructions from the server.

Most computing devices (e.g., smartphones, laptop computers, tablet computers, etc.) are capable of emitting ultrasonic sound and/or detecting ultrasonic sound. This may allow various computing devices to be included in the system architecture. In addition, ultrasonic sound may generally not penetrate through solid obstacles such as walls, doors, etc. This may allow the system architecture to more easily determine whether computing devices are in proximity to each other. For example, this may allow the system architecture to determine whether computing devices are in the same room.

FIG. 1 is a block diagram illustrating a system architecture 100, in accordance with some embodiments. The system architecture includes a server 110, a data store 120, a network 105, and computing devices 130A through 130G. The server 110 may also be a computing device. Examples of a computing device may include, but are not limited to, a rack-mount server, a router computer, a server computer, a personal computer, a mainframe computer, a smartphone, a personal digital assistant (PDA), a laptop computer, a tablet computer, a desktop computer, speakers, televisions (e.g., smart TVs), set top boxes (STB), etc. The network 105 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), and/or a combination thereof.

The data store 120 may be a memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In one embodiment, the data store 120 may be directly coupled to the server 110 (as indicated by the solid line between the data store 120 and the server 110). In another embodiment, the data store 120 may be coupled to the server 110 via the network 105. The data store 120 includes signature data 121 and proximity data 122 (as discussed in more detail below). In one embodiment, the signature data 121 may include data that indicates which ultrasonic audio signatures are assigned to the computing devices 130A through 130G. In one embodiment, the proximity data 122 may include data that indicates which computing devices 130A through 130G are in proximity to each other.

In one embodiment, an ultrasonic audio signature may include one or more ultrasonic frequencies of sound that are emitted (e.g., played, broadcasted, transmitted, etc.) for one or more intervals/periods of time. For example, an ultrasonic audio signature may include a first ultrasonic sound frequency that is emitted for a first period of time (e.g., 200 milliseconds, 1 second, etc.), a second ultrasonic sound frequency that is emitted for a second period of time, etc. In another embodiment, an ultrasonic audio signature may include multiple ultrasonic sound frequencies that are emitted during the same period of time. For example, an ultrasonic audio signature may include a first ultrasonic sound frequency that is emitted for a first period of time and a second and third ultrasonic sound frequency of sound that are emitted simultaneously for a second period of time. Ultrasonic sound frequencies may be sound with a frequency that is greater that the upper limit of general human hearing. For example, ultrasonic sound frequencies may include sound frequencies that are greater than or equal to 18 kilohertz (kHz). In one embodiment, the sound frequencies that may be used for an ultrasonic frequency may be between 20 kHz and 22 kHz. It shall be understood that in other embodiments, other ranges of ultrasonic sound frequencies may be used.

As illustrated in FIG. 1, the server 110 includes a proximity module 111. In one embodiment, the proximity module 111 may receive one or more registration requests from the computing devices 130A through 130G. A registration request may be a message, packet, and/or other data indicating that a computing device (e.g., computing device 130A) is requesting the proximity module 111 to provide the computing device with proximity data (e.g., all or portions of proximity data 122). The proximity data may indicate whether computing devices 130A through 130G are in proximity to each other and/or may indicate which computing devices 130A through 130G are in proximity to each other. The registration request may also include data that may be used to identify a computing device 130. For example, the registration request may include a name, an internet protocol (IP) address, a serial number, a medium access control (MAC) address, a model number, an identifier, an email address, etc.

In one embodiment the proximity module 111 may receive requests (e.g., messages, packets, etc.) for ultrasonic audio signatures from the computing devices 130A through 130G (e.g., from the signature modules 131 of the computing devices 130A through 130G). The proximity module 111 may assign an ultrasonic audio signature to each computing device 130A through 130G that requests an ultrasonic audio signature. The proximity module 111 may transmit data indicative of an ultrasonic audio signature to each computing device 130A through 130G that requests an audio signature. As discussed above, an ultrasonic audio signature may include one or more ultrasonic sound frequencies that are emitted for one or more intervals/periods of time. The data indicative of ultrasonic audio signature may include a list of one or more ultrasonic sound frequencies and time intervals associated with the one or more ultrasonic sound frequencies (e.g., different intervals/periods of time for emitting the ultrasonic sound frequencies). The computing devices 130A through 130G that request ultrasonic audio signatures may be referred to as emitters (e.g., broadcasters, transmitters, etc.) or emitter computing devices. A computing device may include the request for an ultrasonic audio signature in the registration request or may transmit the request for the ultrasonic audio signature separately from the registration request.

In another embodiment, the proximity module 111 may receive a message from one or more computing devices 130A through 130G indicating that the one or more computing devices 130A through 130G may provide audio data to the server 110 (e.g., to the proximity module 111). For example, a computing device may transmit a message indicating that the computing device may detect ultrasonic sound frequencies (e.g., may record/capture ultrasonic sound) and may transmit audio data indicating the ultrasonic frequencies that were detected. The computing devices that transmit a message indicating that the computing devices may provide audio data to the server 110 may be referred to as listeners (e.g., receivers, etc.) or listener computing devices. A computing device may include the message (indicating that the computing devices may provide audio data) in the registration request or may transmit the message separately from the registration request.

In one embodiment, the audio data may also indicate which ultrasonic sound frequencies are detected during different periods, intervals, or points in time. For example, the audio data may indicate that ultrasonic sound frequencies above a threshold amplitude (e.g., above a threshold sound level) were detected and may indicate the points in time in which the ultrasonic sound frequencies were detected. The ultrasonic sound frequencies that are above a threshold amplitude may be referred to as audio peaks or peak values.

As discussed above, the proximity module 111 may receive the audio data from one or more of the computing devices 130A through 130G. In one embodiment, the audio data received from a computing device 130 may include Fast Fourier Transform (FFT) coefficients. The proximity module 111 may downsample the FFT coefficients using various step sizes to identify peak values/audio peaks. For example, the proximity module 111 may downsample the FFT coefficients using a step size of 20 hertz (Hz). If the ultrasonic sound frequency range is between 20 kHz and 22 kHz, there may be one hundred possible peak values/audio peaks. The proximity module 111 may analyze the audio data to determine whether the audio data is indicative of one or more ultrasonic signatures. For example the proximity may plot the audio peaks on a 2-dimensional graph (e.g., a 2-D map), as discussed in more detail below. The audio peaks may form a 2-D shape on the 2-D graph. The proximity module 111 may perform (e.g., run and/or execute) a Hough Transform to detect the 2-D shape, as discussed in more detail below. In one embodiment, the 2-D shape may be the ultrasonic audio signature that is detected by a computing device 130 (e.g., by a listener computing device). In one embodiment, the ultrasonic audio signature (e.g., the 2-D shape) for a computing device 130 may be represented using polar coordinates. Using a polar coordinate system may allow the proximity module 111 to detect the ultrasonic audio signature even though the portions of the ultrasonic audio signature may be detected at different times.

In one embodiment, the proximity module 111 may determine whether one or more of the computing devices 130A through 130G are in proximity to each other based on the audio data received from the computing devices 130A through 130G. For example, computing device 130C may transmit audio data indicative of an ultrasonic audio signature emitted by computing device 130B (e.g., the computing device 130C may detect the ultrasonic audio signature emitted by computing device 130B). The proximity module 111 may determine that the computing device 130B is in proximity to the computing device 130C, and vice versa. In one embodiment, two computing devices (e.g., computing device 130B and computing device 130C) may be in proximity to each other when one of the computing devices can detect an ultrasonic audio signature emitted (e.g., transmitted, broadcasted, etc.) by the other computing device, and vice versa.

In another embodiment, the proximity module 111 may generate and/or modify a graph, table, list, and/or other data that may be used to determine which computing devices 130A through 130G are in proximity to each other, as discussed in more detail below and as illustrated in FIG. 3. For example, the proximity module 111 may generate a device graph (e.g., device graph 300 illustrated in FIG. 3) and the device graph may indicate which computing devices are in proximity to each other. The graph, table, list, and/or other data that may indicate which computing devices are in proximity to each other may be stored in the proximity data 122 of the data store 120.

In one embodiment, the proximity module 111 may transmit a message to computing devices (that are in proximity to each other) to indicate that the computing devices are in proximity to each other. For example, the proximity module 111 may transmit a message to the computing device 130C and the message may indicate that the computing device 130B is in proximity to the computing device 130C. In another example, the proximity module 111 may transmit a message to the computing device 130B and the message may indicate that the computing device 130C is in proximity to the computing device 130B. In one embodiment, the message may include a list of computing devices that are in proximity to a computing device. For example, the proximity module 111 may transmit a message to computing device 130D that includes computing devices 130C and 130E (to indicate that computing devices 130C and 130E are in proximity to the computing device 130D).

In one embodiment, the proximity module 111 may transmit a message to a first computing device (indicating that one or more other computing devices are in proximity to the first computing device) when the proximity module 111 determines (based on audio data) that the one or more other computing devices are in proximity to the first computing device. For example, the proximity module 111 may periodically and/or automatically transmit the message to the first computing device. In another embodiment, the proximity module 111 may transmit the message to the first computing device when the proximity module 111 receives a request for proximity data (e.g., data indicating which computing devices are in proximity to the first computing device).

In one embodiment, the proximity module 111 may receive additional audio data from a computing device and may determine that the computing device is no longer able to detect a previously detected ultrasonic audio signature emitted by another computing device that was in proximity to the computing device. For example, computing device 130B may transmit additional audio data to the proximity module 111. The additional audio may not be indicative of the ultrasonic audio signature emitted by computing device 130C. The proximity module 111 may determine that the computing device 130B is no longer in proximity with the computing device 130C (and vice versa). The proximity module 111 may update a graph, table, list, and/or other data (e.g., device graph 300 illustrated in FIG. 3) to indicate that the computing device 130B is no longer in proximity with the computing device 130C (and vice versa).

In one embodiment, the proximity module may also transmit one or more instructions to a first computing device indicating that the first computing device should pair (e.g., establish a connection and/or communicate data) with a second computing device that is in proximity to the first computing device. For example, a tablet computer may receive an instruction to perform a Bluetooth pairing with a speaker (e.g., a Bluetooth speaker). This may allow the tablet computer to play music via the speaker. In another example, a smartphone may receive instructions to pair with a television. This may allow the smartphone to cast (e.g., stream) video to the television. In another embodiment, a first computing device may pair with a second computing device that is in proximity to the first computing device based on the proximity data received by the first computing device (e.g., without an instruction from the server 110 and/or the proximity module 111).

In one embodiment, the proximity module 111 may determine the position of a computing device relative to another computing device, based on audio data. For example, a first computing device may transmit audio data indicative of an ultrasonic audio signature emitted by a second computing device. The proximity module 111 may determine that the second computing device is to the left of the first computing device based on the audio data. For example, the proximity module 111 may triangulate the position of the second computing device relative to the first computing device based on the audio data.

In one embodiment, the proximity module 111 may assign and/or may manage the ultrasonic audio signatures that are assigned to the computing devices 130A through 130G. For example, the proximity module 111 may track and/or record which ultrasonic audio signatures are assigned to which computing device 130A through 130G. Data indicative of the assignment of the ultrasonic audio signatures may be stored in the signature data 121 of the data store 120. For example, the signature data 121 may include a list of the computing devices 130A through 130G and the audio signatures assigned to the computing devices 130A through 130G. In another embodiment, the proximity module 111 may assign a new ultrasonic audio signature to a computing device. For example, the proximity module 111 may detect a conflict in the ultrasonic audio signatures of two computing devices (e.g., may detect that two computing devices that are in proximity to each other are using the same ultrasonic audio signature). The proximity module 111 may assign a new ultrasonic audio signature to one of the two computing devices (e.g., may transmit data indicative of the new ultrasonic audio signature to one of the two computing devices). The proximity module 111 may update the signature data 121 when a new ultrasonic audio signature is assigned to a computing device.

In one embodiment, the proximity module 111 may assign computing devices to one or more groups (e.g., sets) of computing devices. For example, computing devices 130A, 130B, and 130C are assigned to group 141, computing devices 130C, 130D, and 130E are assigned to group 142, and computing devices 130E and 130F are assigned to group 143. The proximity module 111 may assign the same ultrasonic audio signature to two computing devices when the two computing devices are not in the same group. For example, proximity module 111 may assign the same ultrasonic audio signature to computing devices 130C and 130F because computing devices 130C belongs to group 142 and computing device 130F belongs to group 143. Assigning the same ultrasonic audio signature to multiple computing devices may allow the proximity module 111 to use fewer ultrasonic audio signatures. This may also allow the proximity module 111 to support a larger number of computing devices. Using fewer ultrasonic audio signatures may also allow the proximity module 111 to detect ultrasonic audio signatures more easily. In one embodiment, two computing devices may be assigned the same ultrasonic audio signature when a new computing device is added to a group. The proximity module 111 may detect that two devices within the same group are using the same ultrasonic audio signature (e.g., may detect a conflict) and may assign a new ultrasonic audio signature to one of the two computing devices.

As discussed above, computing devices may request and/or may be assigned an ultrasonic audio signature. The computing devices that request and/or are assigned an ultrasonic audio signature may emit (e.g., broadcast, transmit, etc.) the ultrasonic audio signature repeatedly (e.g., continuously). For example, computing device 130C may emit its ultrasonic audio signature every 500 milliseconds, every second, every 3 seconds, etc. Also as discussed above, computing devices that emit an ultrasonic audio signature may be referred to as emitters or emitter computing devices. Computing devices 130C, 130E, 130F, and 130G may be emitters/emitter computing devices, as indicated by the speaker icon above the computing devices 130C, 130E, 130F, and 130G.

As illustrated in FIG. 1, the computing devices 130C, 130E, 130F, and 130G may each include a signature module 131. In one embodiment, the signature module 131 may transmit a request for an ultrasonic audio signature to the server 110 and/or the proximity module 111. The signature module 131 may receive data indicate of an ultrasonic audio signature and may emit the ultrasonic audio signature repeatedly. For example, the signature module 131 may emit the ultrasonic audio signature via a speaker (or via any other device capable of producing/generating sound).

In another embodiment, the signature module 131 may receive the proximity data and may determine whether there are other computing devices in proximity based on the proximity data. For example, signature module 131 of computing device 130A may determine that computing device 130C is in proximity to the computing device 130A based on proximity data received from the proximity module 111. The signature module 131 may transmit a request for proximity data (e.g., a portion or all of proximity data 122) and/or may receive the proximity data when the proximity module 111 determines that there are one or more computing devices in proximity to the computing devices 130A, as discussed above.

In addition, as discussed above, computing devices may indicate to the proximity module 111 (e.g., may transmit a message to the proximity module 111) that the computing devices will detect (e.g., capture or record) ultrasonic sound and may transmit audio data (indicative of the ultrasonic sound that was detected) to the proximity module. For example, computing devices 130A, 130B, 130C, 130D, 130E, and 130G may detect ultrasonic sound and may transmit audio data to the proximity module 111. Also as discussed above, computing devices that provide audio data to the proximity module 111 may be referred to as listeners or listener computing devices. Computing devices 130A, 130B, 130C, 130D, 130E, and 130G may be listeners/listener computing devices as indicated the "ear" icon above the computing devices 130A, 130B, 130C, 130D, 130E, and 130G.

In one embodiment, a computing device that provides audio data (e.g., a listener or listener computing device such as computing device 130A) may detect (e.g., capture, record, etc.) ultrasonic sound via a microphone (or any other device that may be used to detect sound). For example, the computing devices may detect ultrasonic sound (e.g., may listen, capture, or record) ultrasonic sound for a period of time. The period of time (in which the computing device detects ultrasonic sound) may be referred to as a frame. The signature module 131 of the computing device may generate audio data that includes and/or indicates the ultrasonic sound detected by the computing devices during a frame. The signature module 131 may process the audio data using a FFT to detect peak values/audio peaks in the ultrasonic sound. For example, the signature module 131 may identify ultrasonic sound frequencies with amplitudes (e.g., with a strength or volume) above a threshold. The signature module 131 may record the peak values/audio peaks and may record when the peak values/audio peaks were detected (e.g., times or timestamps when the peak values/audio peaks were detected) in the audio data. The signature module 131 may transmit the audio data to the server 110 and/or proximity module 111.

In one embodiment, a computing device may detect multiple audio signatures within a frame. For example, a computing device may detect ultrasonic audio signatures emitted by multiple computing devices. Because the computing devices may begin detecting ultrasonic sound at different times, an emitter computing device may not finish emitting an ultrasonic sound signature within a frame (e.g., within the period of time in which the computing devices was detecting ultrasonic sound). The proximity module 111 may store (e.g., cache or buffer) multiple audio data received from a computing device. This may allow the proximity module 111 to detect ultrasonic sound signatures that detected (e.g., captured) across multiple frames.

As illustrated in FIG. 1, the computing devices 130A, 130B, 130C, 130D, 130E, and 130G may each include a signature module 131. In one embodiment, the signature module 131 may transmit a message to a server indicating that the apparatus will provide audio data to the server. The signature module 131 may obtain audio data (e.g., may detect, capture, record, etc., ultrasonic sound). The signature module 131 may also process the audio data (e.g., may perform a FFT on the audio data to detect peak values/audio peaks) and may transmit the audio data to the server, as discussed above.

In one embodiment, the signature module 131 may pair (e.g., establish a connection and/or communicate data) with another computing device (that is in proximity). For example, the signature module 131 may establish a Bluetooth connection with another computing device (that is in proximity). In one embodiment, the signature module 131 may pair with the other computing device based on the proximity data. In another embodiment, the signature module 131 may pair with the other computing devices based on an instruction received from the proximity module 111.

It shall be understood that in different embodiments, a computing device may be an emitter/emitter computing device, a listener/listener computing device, or both. For example, computing device 130A may be a listener/listener computing device, computing device 130F may be an emitter/emitter computing device and computing device 130G may be both a listener/listener computing device and an emitter/emitter computing device.

Figure 2A:
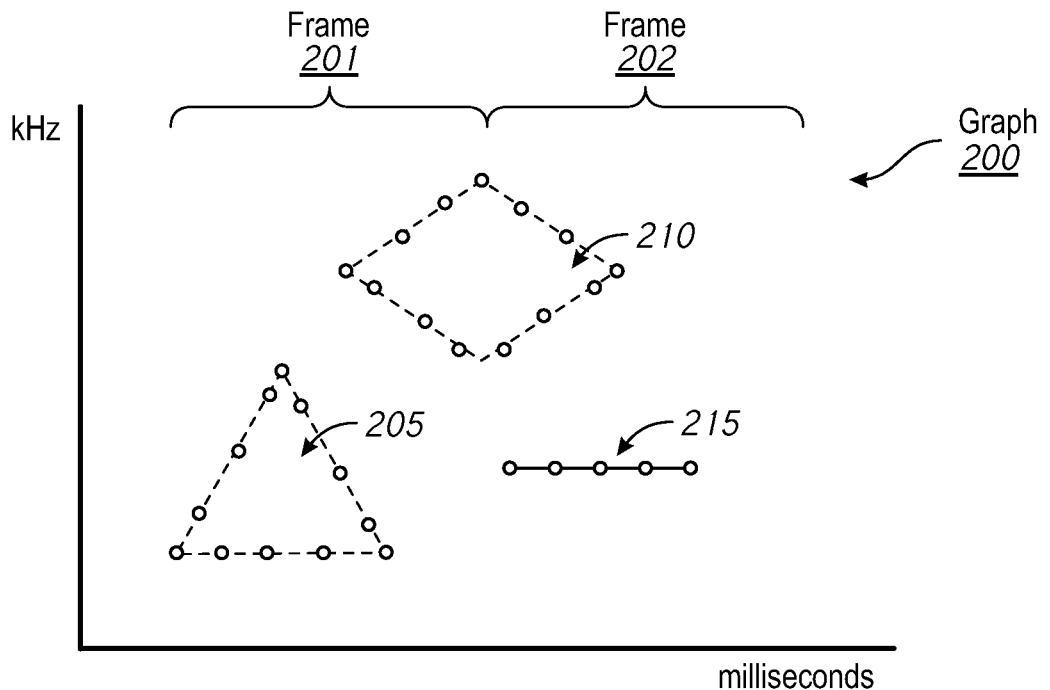
FIG. 2A is a diagram illustrating a graph including example ultrasonic audio signatures, in accordance with some embodiments.

FIG. 2A is a diagram illustrating a graph 200 including example ultrasonic audio signatures, in accordance with some embodiments. In one embodiment, the graph 200 may indicate peak values/audio peaks that are detected by a computing device at different times. The X-axis of the graph may indicate the time (in milliseconds) and the Y-axis may indicate the ultrasonic frequency (in kHz) that was detected. Each dot on in the graph 200 may indicate that a peak value/audio peak with an ultrasonic frequency was detected at a point in time. In one embodiment, the graph 200 may represent and/or may be generated based on audio data received from one or more computing devices (as discussed above).

As discussed above, a proximity module and/or server may analyze the graph 200 (which may represent audio data received from a computing device) and may determine whether the graph includes one or more ultrasonic audio signatures. For example, the proximity module and/or server may perform Hough transforms on the graph to identify shapes (e.g., 2-D shapes) in the graph 200. The 2-D shapes may represent ultrasonic audio signatures that are detected by a computing device. Referring to FIG. 2A, the graph 200 includes three shapes 205, 210, and 215. Shape 205 may be a triangle shape and may be indicative of an ultrasonic audio signature emitted by a first computing device. Shape 210, may be a diamond shape and may be indicative of an ultrasonic audio signature emitted by a second computing device. Shape 215 may be a line and may be indicative of an ultrasonic audio signature emitted by a third computing device. As illustrated in FIG. 2A, the shapes 205, 210, and 215 may be detected across two frames 201 and 202 (e.g., across two periods/intervals of time). The shapes 205, 210, and 215 may be detected by the proximity module and/or server (e.g., using a Hough transform) and may indicate that the computing devices that transmitted the audio data is in proximity to first, second and third computing devices. As discussed above, the proximity module and/or server may use polar coordinates when analyzing the graph 200. For example, the proximity module and/or server may convert the graph 200 into a polar graph that uses polar coordinates.

In one embodiment, a proximity module and/or server may use straight lines as ultrasonic audio signatures. A straight line may be represented in polar coordinates using the following equation:

$$r\theta = (\cos(\theta)*x) + (\sin \theta*y) \qquad (1)$$

where θ is the speed of the linear variation in the ultrasonic frequency. The term θ may be expressed in radians. Using different values for θ in the equation (1) may result in different lines. The proximity module and/or server may use different values for θ in the equation (1) to identify a line and/or a θ value that matches (or best matches) an ultrasonic audio signature (e.g., an ultrasonic signature that is a straight line). For example, as discussed above, the shape 215 may be a straight line that that represents an ultrasonic audio signature. The proximity module and/or server may use different values for θ in the equation (1) to find a line and/or a θ value that matches (or best matches) the shape 215. It shall be understood that the proximity module and/or server may use any number of values for θ (e.g., may try different values for θ starting from a lower value or a higher value, or vice versa) to identify a line and/or a θ value that matches (or best matches) the shape 215.

It shall be understood that the shapes illustrated herein are merely examples and that in other embodiments various other shapes (e.g., geometric shapes such as ellipses, rectangles, pentagons, octagons, or non-geometric shapes) may be used.

Figure 2B:
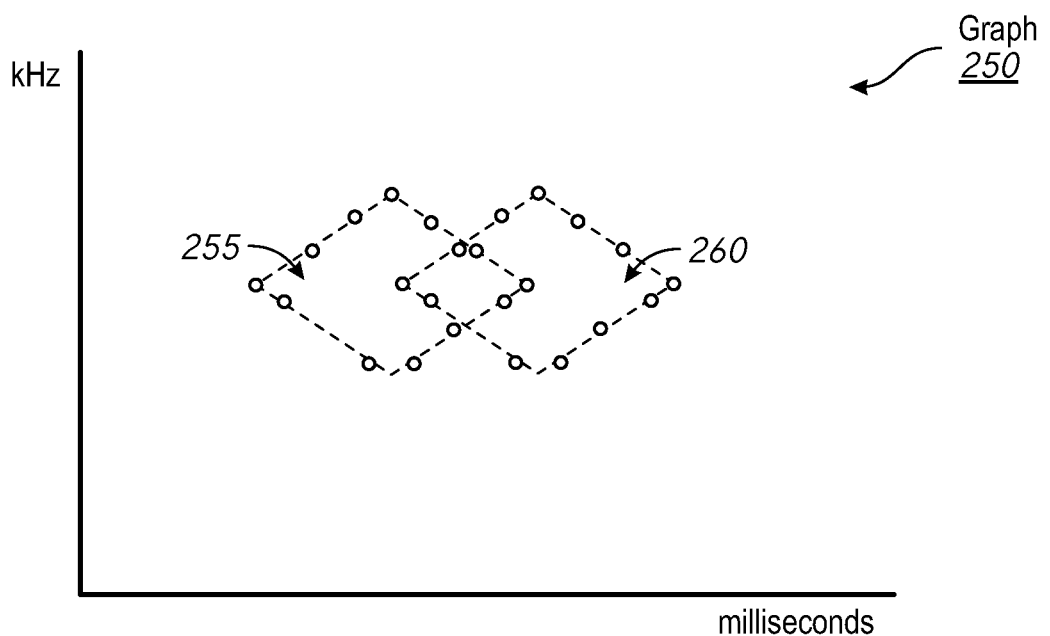
FIG. 2B is a diagram illustrating a graph including example ultrasonic audio signatures, in accordance with some embodiments.

FIG. 2B is a diagram illustrating a graph 250 including example ultrasonic audio signatures, in accordance with some embodiments. In one embodiment, the graph 250 may indicate peak values/audio peaks that are detected by a computing device at different times. The X-axis of the graph may indicate the time (in milliseconds) and the Y-axis may indicate the ultrasonic frequency (in kHz) that was detected. Each dot on in the graph 250 may indicate that a peak value/audio peak with an ultrasonic frequency was detected at a point in time. In one embodiment, the graph 250 may represent and/or may be generated based on audio data received from one or more computing devices (as discussed above).

As discussed above, a proximity module and/or server may analyze the graph 200 (which may represent audio data received from a computing device) and may determine whether the graph includes one or more ultrasonic audio signatures. For example, the proximity module and/or server may perform Hough transforms on the graph to identify shapes (e.g., 2-D shapes) in the graph 250. The 2-D shapes may represent ultrasonic audio signatures that are detected by a computing device. Referring to FIG. 2B, the graph 250 includes two shapes 255 and 260. Shape 255 may be a diamond shape and may be indicative of an ultrasonic audio signature emitted by a first computing device. Shape 260 may be a diamond shape and may be indicative of an ultrasonic audio signature emitted by a first computing device.

As illustrated in FIG. 2B, the shape 255 and the shape 260 are both diamond shape. In addition, the shape 255 and the shape 260 overlap (e.g., the ultrasonic audio signatures represented by the shape 255 and the shape 260 were emitted at overlapping times). This may indicate that two computing devices in proximity to each other are using the same ultrasonic audio signature. For example, referring to FIG. 1, computing device 130F may leave group 143 and may join group 141. Computing device 130F may have the same ultrasonic audio signature as another computing device in group 141. The proximity module and/or server may determine that two computing devices in proximity to each other are using the same ultrasonic audio signature based on graph 250 and may assign one of the two computing devices a new ultrasonic audio signature, as discussed above.

FIG. 3 is a diagram illustrating an example device graph 300, in accordance with some embodiments. As discussed above, a proximity module and/or server may receive audio data from one or more computing devices and may determine whether the one or more computing devices are in proximity to each other (e.g., are proximate or near each other) based on the audio data. The proximity module and/or server may generate and/or update a device graph, such as device graph 300, based on the audio data. In one embodiment, the device graph 300 may indicate which computing devices are in proximity with each other. For example, the graph includes nodes 330A through 330G. Each node 330A through 330G represents a computing device that has registered with a proximity module and/or server. Referring to FIG. 1, node 330A represents computing device 130A, node 330B represents computing device 130B, node 330C represents computing device 130C, node 330D represents computing device 130D, node 330E represents computing device 130E, node 330F represents computing device 130F, and node 330G represents computing device 130G.

In one embodiment, an edge between two nodes may indicate that the two computing devices represented by the two nodes are in proximity to each other (e.g., may indicate that one of the two computing devices can detect an ultrasonic audio signature emitted by the other computing device). For example, there is an edge between node 330A and 330C because computing device 130A (which is represented by node 330A) is able to detect an ultrasonic audio signature emitted by computing device 130C (which is represented by node 330C). In another example, there is an edge between the node 330E and 330F because computing device 130E (which is represented by node 330E) is able to detect an ultrasonic audio signature emitted by computing device 130F (which is represented by node 330F). In another embodiment, when there is no edge between two nodes, this may indicate that the two computing devices represented by the two nodes are not in proximity with each other. For example, there is no edge between node 330G and 330F because computing device 130G (which is represented by node 330G) is not able to detect an ultrasonic audio signature emitted by computing device 130F (which is represented by node 330F).

The device graph 300 may also indicate which computing devices have been grouped together by the proximity module and/or server. For example, referring to FIG. 1, computing devices 130A, 130B, and 130C are assigned to group 141, computing devices 130C, 130D, and 130E are assigned to group 142, and computing devices 130E and 130F are assigned to group 143. The proximity module may use box 341 to represent group 141, box 342 to represent group 142, and box 343 to represent group 143.

In one embodiment, as a computing device moves (e.g., as a user moves the computing device), the computing device may come into proximity to other computing devices. The proximity module and/or server may determine that a computing device has moved into proximity to one or more other computing devices (based on audio data received from the one or more other computing devices). The proximity module and/or server may update the device graph 300 to indicate that a computing device has moved into proximity to one or more other computing devices. For example, the proximity module and/or server may add one or more edges between the nodes that represent the moving computing device and the one or more other computing devices. A computing device may also be removed from a group and/or added to a new group when the computing device moves. For example, referring to FIG. 1, if computing device 130G is moved closer to computing device 130A, the computing device 130G may be added to group 141. The device graph 300 may be updated to include node 330G in box 341.

In another embodiment, as a computing device moves (e.g., as a user moves the computing device), the computing device may leave the proximity of other computing devices. The proximity module and/or server may determine that a computing device has left the proximity (e.g., is no longer in proximity) of one or more computing devices based on audio data received from the one or more other computing devices). The proximity module and/or server may update the device graph 300 to indicate that a computing device has left the proximity of one or more other computing devices. For example, the proximity module and/or server may remove one or more edges between the nodes that represent the moving computing devices and the one or more other computing devices. A computing device may also be removed from a group and/or added to a new group when the computing device moves. For example, referring to FIG. 1, if computing device 130G is moved closer to computing device 130A, the computing device 130G may be added to group 141. The device graph 300 may be updated to include node 330G in box 341.

Figure 4A:
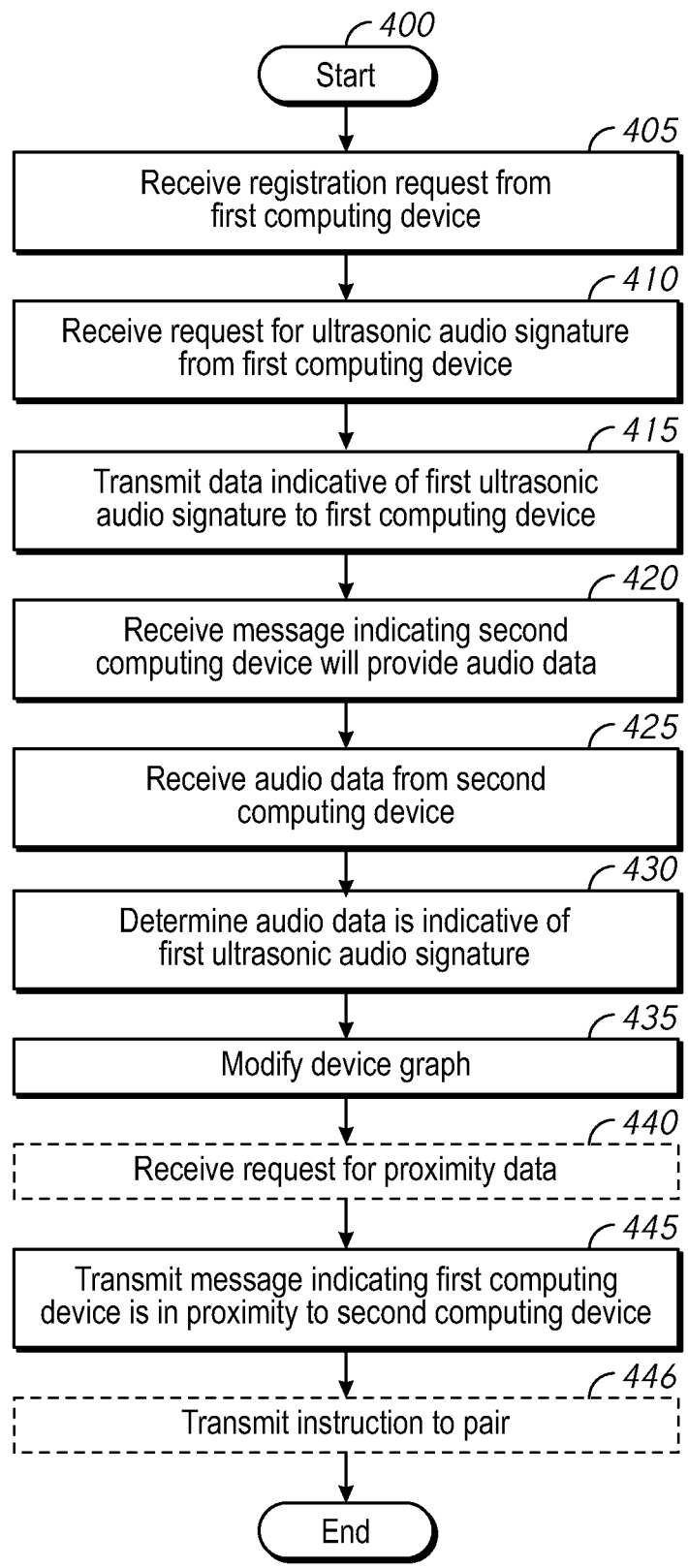
FIG. 4A is a flowchart representation of a method of determining whether computing devices are in proximity, in accordance with some embodiments.

FIG. 4A is a flowchart representation of a method 400 of determining whether computing devices are in proximity, in accordance with some embodiments. In some implementations, the method 400 may be performed by a proximity module and/or server (e.g., proximity module 111 and/or server 110 illustrated in FIG. 1). The proximity module and/or computing device may include hardware (e.g., circuitry, dedicated logic, programmable logic, microcode, etc.), software (e.g., instructions run on a processor to perform hardware simulation), firmware, or a combination thereof. Briefly, method 400 may include transmitting data indicative of a first ultrasonic audio signature, receiving audio data, determining that the audio data is indicative of the audio signature and transmitting a message indicating that two (or more) computing devices are in proximity to each other. The method 400 begins at block 405 where the method 400 includes receiving a registration request from a first computing device, as discussed above. In one embodiment, the method 400 may also include receiving a registration request from a second computing device at block 405. At block 410, the method 400 includes receiving a request for an ultrasonic audio signature from the first computing device. In one embodiment, the request for the ultrasonic audio signature may be included in (e.g., may be part of) the registration request received at block 405 (as discussed above).

The method 400 includes transmitting data indicative of the first ultrasonic signature to the first computing device at block 415. For example, one or more ultrasonic frequencies and one or more time intervals associated with the one or more ultrasonic frequencies may be transmitted to the first computing device, as discussed above. At block 420, the method 400 includes receiving a message from a second computing devices indicating that the second computing device will provide audio data. In one embodiment, the message indicating that the second computing device will provide audio data may be included in the registration request transmitted by the second computing device (which may be received at block 405), as discussed above. The method 400 receives audio data from the second computing device at block 420. For example, audio data indicating peak values/audio peaks may be received, as discussed above. At block 430, the method 400 may determine that the audio data is indicative of the first ultrasonic audio signature. For example, a Hough transform may be performed on the audio data to determine whether the audio data includes the first ultrasonic audio signature, as discussed above. At block 435, the method 400 may modify a device graph (e.g., may generate and/or update a device graph) to indicate that the first computing device is in proximity to the second computing device, based on the audio data.

At block 440, the method 400 may optionally receive a request for proximity data from one or more of the first computing device or the second computing device, as discussed above. The method 400 may transmit a message (indicating that the first computing device is in proximity to the second computing device) to one or more of the first computing device or the second computing device at block 445, as discussed above. As discussed above, in one embodiment, the method 400 may transmit the message based on a request received from one or more of the first computing device or the second computing device. In another embodiment, the method 400 may transmit the message when the method 400 determines that the first computing device is in proximity to the second computing device, as discussed above. At block 446, the method 400 may optionally transmit an instruction for the first computing device to pair (e.g., establish a connection and/or communicate data) with the second computing device.

Figure 4B:
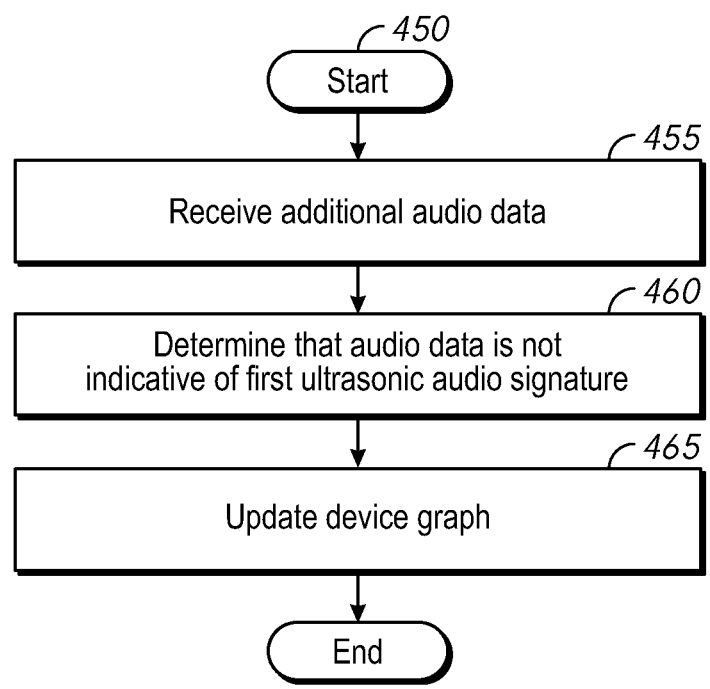
FIG. 4B is a flowchart representation of a method of determining whether computing devices are in proximity, in accordance with some embodiments.

FIG. 4B is a flowchart representation of a method 450 of determining whether computing devices are in proximity, in accordance with some embodiments. In some implementations, the method 450 may be performed by a proximity module and/or computing device (e.g., proximity module 111 and/or server 110 illustrated in FIG. 1). The proximity module and/or computing device may include hardware (e.g., circuitry, dedicated logic, programmable logic, microcode, etc.), software (e.g., instructions run on a processor to perform hardware simulation), firmware, or a combination thereof. Briefly, method 400 may include receiving additional audio data and updating a device graph. For example, the method 400 may add an edge between two nodes in the device graph, as discussed above.

The method 450 begins at block 455 where the method 450 includes receiving additional audio data from a second computing device, as discussed above. At block 455, the method 450 may determine that the additional audio data is not indicative of a first ultrasonic audio signature emitted by a first computing device. This may indicate that the first computing device is no longer in proximity to the second computing device because the second computing device is no longer able to detect the first ultrasonic audio signature emitted (e.g., broadcasted, transmitted) by the first computing device. At block 465, the method 400 may include updating a device graph to indicate that the first computing device is no longer in proximity to the second computing device. For example, the method 400 may remove an edge between two nodes in the device graph, as discussed above.

Figure 5:
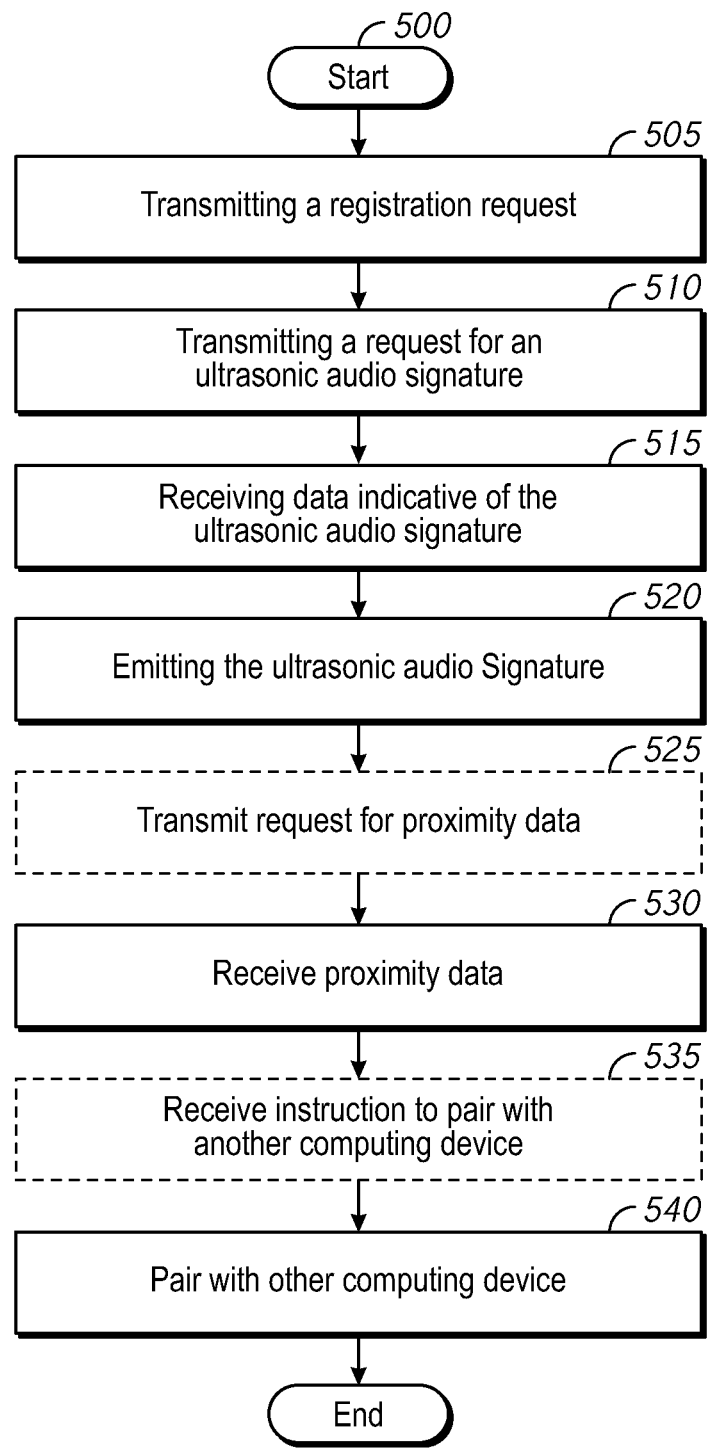
FIG. 5 is a flowchart representation of a method of emitting an ultrasonic audio signature, in accordance with some embodiments.

FIG. 5 is a flowchart representation of a method 500 of emitting an ultrasonic audio signature, in accordance with some embodiments. In some implementations, the method 500 may be performed by a signature module and/or computing device (e.g., signature module 131 and/or computing device 130C illustrated in FIG. 1). The signature module and/or computing device may include hardware (e.g., circuitry, dedicated logic, programmable logic, microcode, etc.), software (e.g., instructions run on a processor to perform hardware simulation), firmware, or a combination thereof. Briefly, method 500 may include transmitting a request for an ultrasonic audio signature and emitting the ultrasonic audio signature. The method 500 begins at block 505 where the method 500 includes transmitting a registration request to a server and/or a proximity module. At block 510, the method 500 includes transmitting a request for an ultrasonic audio signature to the server and/or proximity module. In one embodiment, the request for the ultrasonic signature may be included in the registration request, as discussed above.

The method 500 includes receiving data indicative of the ultrasonic audio signature at block 515. For example, one or more ultrasonic frequencies and one or more time intervals associated with the one or more ultrasonic frequencies may be received from the server and/or proximity module, as discussed above. At block 520, the method 500 includes emitting the ultrasonic audio signature. In one embodiment, the method 500 may repeatedly emit the ultrasonic audio signature (e.g., may emit the ultrasonic audio signature every second), as discussed above. At block 525, the method 500 may optionally include transmitting a request for proximity data (e.g., data indicative of one or more devices that are in proximity) to the server and/or proximity module. At block 530, the method 500 includes receiving the proximity data from the server and/or proximity module. For example, the method 500 may receive data indicating that one or more computing devices are in proximity, as discussed above. At block 535, the method 500 optionally includes receiving an instruction from the server and/or proximity module to pair (e.g., establish a connection and/or communicate data) with another computing devices. For example, an instruction to establish a Bluetooth connection with Bluetooth speaker or a television may be received. At block 540, the method 500 includes pairing with the other computing device. For example, a connection may be established with the Bluetooth speaker.

Figure 6:
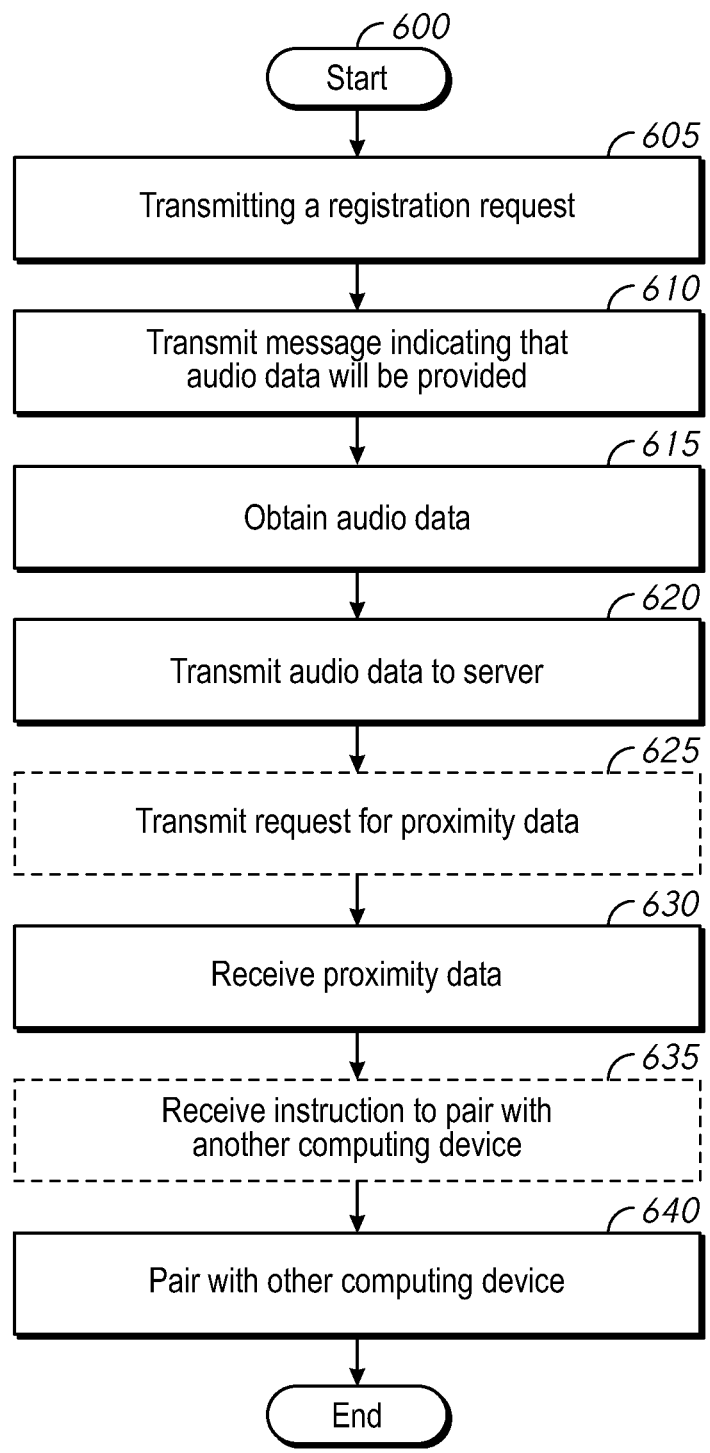
FIG. 6 is a flowchart representation of a method of providing audio data, in accordance with some embodiments.

FIG. 6 is a flowchart representation of a method 600 of providing audio data, in accordance with some embodiments. In some implementations, the method 600 may be performed by a signature module and/or computing device (e.g., signature module 131 and/or computing device 130C illustrated in FIG. 1). The signature module and/or computing device may include hardware (e.g., circuitry, dedicated logic, programmable logic, microcode, etc.), software (e.g., instructions run on a processor to perform hardware simulation), firmware, or a combination thereof. Briefly, method 600 may include transmitting a message indicating that audio data will be provided, obtaining the audio data, and providing the audio data to a server and/or proximity module. The method 600 begins at block 605 where the method 600 includes transmitting a registration request to a server and/or a proximity module. At block 610, the method 600 includes transmitting a message (indicating that the method 600 may provide proximity data) to a server and/or proximity module. In one embodiment, the message (indicating that proximity data will be provided to the server and/or proximity module) may be included in the registration request, as discussed above.

The method 600 includes obtaining the audio data at block 615. For example, the method 600 may capture ultrasonic sound using a microphone, as discussed above. In one embodiment, the method 600 may also process and/or analyze the ultrasonic sound to generate the audio data. For example, the method 600 may generate the audio data using an FFT, as discussed above. In one embodiment, the method 600 may repeatedly obtain audio data. For example, the method 600 may obtain audio data every 500 milliseconds, every second, etc. At block 620, the method 600 includes transmitting the audio data to the server and/or proximity module, as discussed above. At block 625, the method 600 may optionally include transmitting a request for proximity data (e.g., data indicative of one or more devices that are in proximity) to the server and/or proximity module. At block 630, the method 600 includes receiving the proximity data from the server and/or proximity module. For example, the method 600 may receive data indicating that one or more computing devices are in proximity, as discussed above. At block 635, the method 600 optionally includes receiving an instruction from the server and/or proximity module to pair (e.g., establish a connection and/or communicate data) with another computing devices. For example, an instruction to establish a Bluetooth connection with Bluetooth speaker or a television may be received. At block 640, the method 600 includes pairing with the other computing device. For example, a connection may be established with the Bluetooth speaker.

Figure 7:
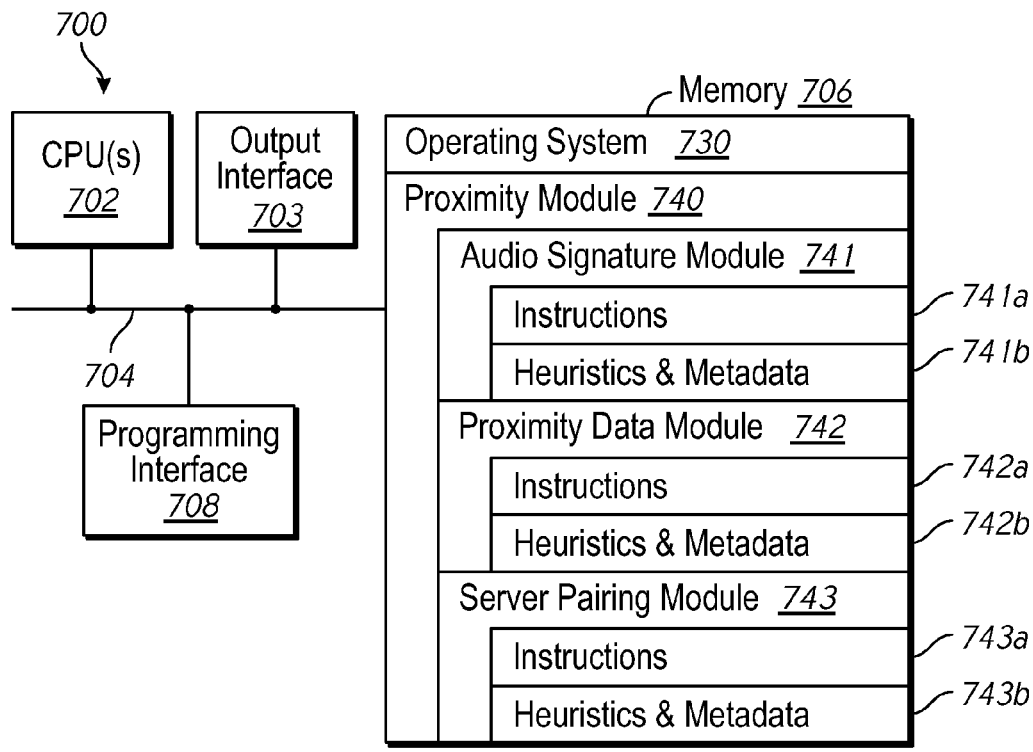
FIG. 7 is a block diagram of a computing device, in accordance with some embodiments.

FIG. 7 is a block diagram of a computing device 700, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more output interfaces 703, a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730 and a proximity module 740. In some embodiment, one or more instructions are included in a combination of logic and non-transitory memory. The operating system 730 includes procedures for handling various basic system services and for performing hardware dependent tasks. In some embodiments, the proximity module 740 may be configured to receive registration requests, receive requests for audio signatures, receive audio data, determine whether computing devices are in proximity to each other, transmit proximity data, and modify device graphs. The proximity module 740 may also perform various functions, operations, methods, and/or tasks, as discussed above. To that end, the proximity module 740 includes an audio signature module 741, a proximity data module 742, and a server pairing module 743.

In some embodiments, the audio signature module 741 may receive requests for audio signatures, may assign audio signatures to computing devices, and may transmit data indicative of audio signatures. To that end, the audio signature module 741 includes a set of instructions 741*a* and heuristics and metadata 741*b*. In some embodiments, the proximity data module 742 may receive audio data, may determine whether the audio data is indicative of ultrasonic audio signatures, may update a device graph, and may transmit proximity data. To that end, the proximity data module 742 includes a set of instructions 742*a* and heuristics and metadata 742*b*. In some embodiments, the server pairing module 743 may transmit instructions (to pair) to computing devices. To that end, the server pairing module 743 includes a set of instructions 743*a* and heuristics and metadata 743*b*.

Although the proximity module 740, the audio signature module 741, the proximity data module 742, and the server pairing module 743 are illustrated as residing on a single computing device 700, it should be understood that in other embodiments, any combination of the proximity module 740, the audio signature module 741, the proximity data module 742, and the server pairing module 743 may reside on separate computing devices.

Figure 8:
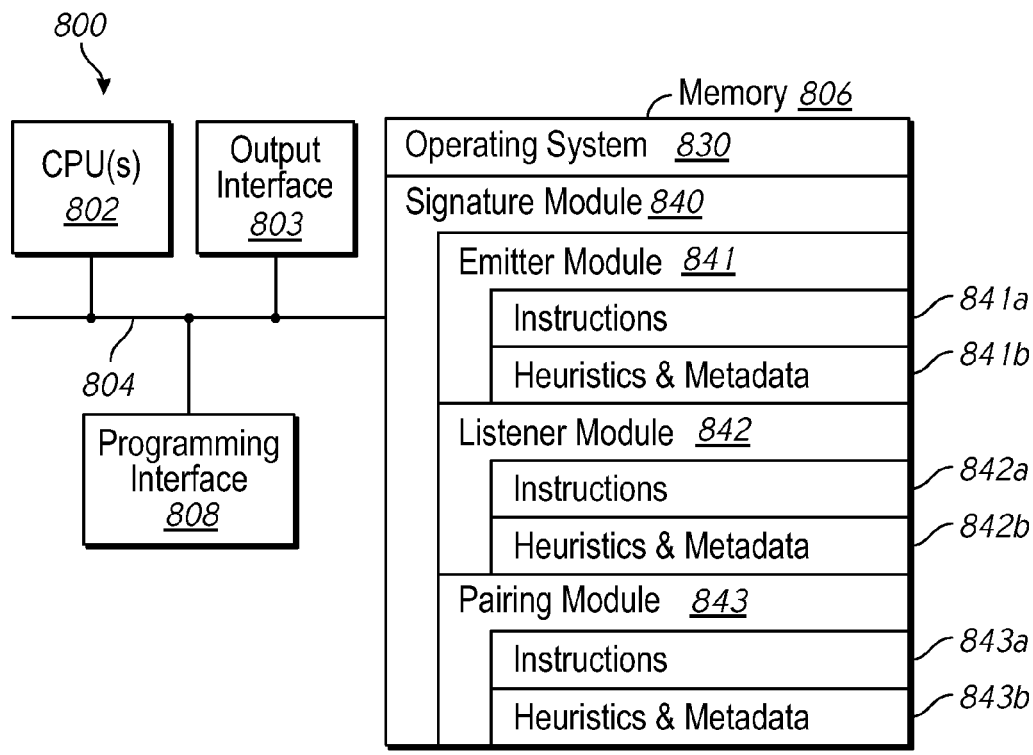
FIG. 8 is a block diagram of a computing device, in accordance with some embodiments.

FIG. 8 is a block diagram of a computing device 800, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803, a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830 and a signature module 840. In some embodiment, one or more instructions are included in a combination of logic and non-transitory memory. The operating system 830 includes procedures for handling various basic system services and for performing hardware dependent tasks. In some embodiments, the signature module 840 may be configured to transmit registration requests, transmit requests for audio signatures, emit ultrasonic audio signatures, transmit a message indicating that audio data will be provided, obtain audio data, transmit audio data, receive instructions to pair, and pair with other computing devices. To that end, the signature module 840 includes an emitter module 841, a listener module 842, and a pairing module 843.

In some embodiments, the emitter module 841 may transmit a registration request, may transmit a request for an ultrasonic audio signature, may receive data indicative of the ultrasonic audio signature, and may emit the ultrasonic audio signature. To that end, the emitter module 841 includes a set of instructions 841a and heuristics and metadata 841b. In some embodiments, the listener module 842 transmit a registration request, transmit a message indicating that audio data will be provided, obtain audio data, and transmit audio data. To that end, the listener module 842 includes a set of instructions 842a and heuristics and metadata 842b. In some embodiments, the pairing module 843 pair with one or more computing devices based on an instruction and/or proximity data received from a server. To that end, the pairing module 843 includes a set of instructions 843a and heuristics and metadata 843b.

Although the signature module 840, the emitter module 841, the listener module 842, and the pairing module 843 are illustrated as residing on a single computing device 800, it should be understood that in other embodiments, any combination of the signature module 840, the emitter module 841, the listener module 842, and the pairing module 843 may reside on separate computing devices.

Moreover, FIGS. 7 through 8 are intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIGS. 7 through 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at a server including one or more processors, a non-transitory memory, and a communication interface:
   receiving a first registration for a first ultrasonic audio signature from a first computing device;
   transmitting first data indicative of the first ultrasonic audio signature to the first computing device in response to the first registration request;
   receiving audio data from a second computing device;
   determining whether the audio data corresponds to the first ultrasonic audio signature; and
   transmitting, to one or more of the first computing device or the second computing device, a message indicating that the first computing device is in proximity to the second computing device according to a determination that the audio data corresponds to the first ultrasonic audio signature.

2. The method of claim 1, further comprising:
   modifying a device graph to indicate that the first computing device is in proximity to the second computing device.

3. The method of claim 2, further comprising:
   receiving additional audio data from the second computing device;
   determining that the additional audio data is not indicative of the first ultrasonic signature; and
   updating the device graph to indicate that the first computing device is not in proximity to the second computing device.

4. The method of claim 1, further comprising:
   receiving a request for proximity from one or more of the first computing device or the second computing device, wherein the message is transmitted to one or more of the first computing device or the second computing device based on the request.

5. The method of claim 1, further comprising:
   transmitting first data indicative of the first ultrasonic audio signature to a third computing device, wherein the third computing device is not in proximity to the first computing device.

6. The method of claim 5, wherein the first computing device and the second computing device are in a first group of devices and the third computing device is in a second group of devices.

7. The method of claim 1, wherein transmitting the message indicating that the first computing device is in proximity to the second computing device comprises:
   transmitting an instruction to one or more of the first computing device or the second computing device, wherein the instruction indicates that the first computing device and the second computing device should pair.

8. The method of claim 1, wherein determining that the audio data is indicative of the first ultrasonic audio signature comprises:
   performing a Hough transform on the audio data; and
   identifying the ultrasonic audio signature based on the Hough transform.

9. The method of claim 1, wherein the first registration request comprises a request for the first ultrasonic audio signature.

10. The method of claim 1, further comprising:
    transmitting second data indicative of a second ultrasonic audio signature to the first computing device.

11. The method of claim 1, wherein the first data indicative of the first ultrasonic audio signature comprises: one or more ultrasonic frequencies and one or more time intervals associated with the one or more ultrasonic frequencies.

12. The method of claim 1, further comprising:
    receiving a second message from the second computing device, the second message indicating that second computing device will provide the audio data.

13. A method comprising:
    at a first computing device including one or more processors, a non-transitory memory, and a communication interface:
    transmitting a registration request for an ultrasonic audio signature to a server;
    receiving first data indicative of the ultrasonic audio signature from the server in response to the registration request; and
    emitting the ultrasonic audio signature based on the first data indicative of the ultrasonic audio signature according to a predefined schedule in order to identify the first computing device.

14. The method of claim 13, further comprising:
    transmitting a request for proximity data to the server, the proximity data indicative of whether one or more computing devices are in proximity; and
    receiving a message comprising the proximity data from the server.

15. The method of claim 14, wherein the proximity data indicates that a first computing devices is in proximity to a second computing device.

16. The method of claim 14, wherein the message comprising the proximity data comprises an instruction to pair with a computing device.

17. An apparatus, comprising:
    a communication interface;
    one or more processors; and
    a memory comprising instructions that when executed by the one or more processors cause the apparatus to perform operations for proximity detection of a computing device comprising:
    transmitting to a server a message indicating that the apparatus will provide ultrasonic audio data to the server;
    capturing the ultrasonic audio data via a microphone of the apparatus,
    transmitting to the server the ultrasonic audio data and a request for proximity data; and
    receiving from the server a message comprising the proximity data,
    wherein the proximity data are indicative of whether the apparatus is in proximity to a computing device, the proximity data being based in whether an ultrasonic audio signature of the computing device exits in the capture ultrasonic audio data.

18. The apparatus of claim 17, wherein the operations further comprise:
    causing the apparatus to be paired with the computing device based on whether the apparatus is in proximity to the computing device as indicated by the proximity data.

19. The apparatus of claim 17, wherein the proximity data indicates that the apparatus is in proximity to the computing device.

20. The apparatus of claim 18, wherein the message comprising the proximity data comprises an instruction to pair with the computing device.

* * * * *